United States Patent
Sewcz et al.

(10) Patent No.: US 9,399,985 B2
(45) Date of Patent: Jul. 26, 2016

(54) HYDRAULIC VALVE ARRANGEMENT AND HYDRAULIC MACHINE ARRANGEMENT HAVING A VALVE ARRANGEMENT OF THIS KIND

(71) Applicant: Robert Bosch GmbH, Stuttgart (DE)

(72) Inventors: Martin Sewcz, Horb-Altheim (DE); Friedemann Nordt, Eutingen (DE); Carola Diebold, Eutingen (DE)

(73) Assignee: Robert Bosch GmbH, Stuttgart (DE)

( * ) Notice: Subject to any disclaimer, the term of this patent is extended or adjusted under 35 U.S.C. 154(b) by 348 days.

(21) Appl. No.: 14/056,190

(22) Filed: Oct. 17, 2013

(65) Prior Publication Data

US 2014/0103233 A1 Apr. 17, 2014

(30) Foreign Application Priority Data

Oct. 17, 2012 (DE) .......................... 10 2012 218 903

(51) Int. Cl.
| | |
|---|---|
| F04B 1/20 | (2006.01) |
| F04B 49/00 | (2006.01) |
| F04B 49/22 | (2006.01) |
| F16K 11/07 | (2006.01) |
| F04B 49/08 | (2006.01) |
| F15B 20/00 | (2006.01) |
| F15B 13/00 | (2006.01) |

(52) U.S. Cl.
CPC .............. *F04B 1/2042* (2013.01); *F04B 49/002* (2013.01); *F04B 49/22* (2013.01); *F16K 11/0716* (2013.01); *F04B 49/08* (2013.01); *F15B 20/008* (2013.01); *F15B 2013/008* (2013.01); *F15B 2211/20553* (2013.01); *F15B 2211/8633* (2013.01)

(58) Field of Classification Search
CPC ........ F04B 49/002; F04B 49/08; F04B 49/22; F04B 49/2205; F04B 1/324; F15B 20/008; F15B 2211/20553
See application file for complete search history.

(56) References Cited

U.S. PATENT DOCUMENTS

| | | | | |
|---|---|---|---|---|
| 4,293,284 A | * | 10/1981 | Carlson ................... | F04B 49/08 417/218 |
| 5,778,924 A | * | 7/1998 | Stangl ..................... | F04B 49/08 137/269 |
| 5,876,185 A | * | 3/1999 | Schimpf ................. | F04B 49/08 417/212 |
| 7,044,442 B2 | * | 5/2006 | Belser .................... | F04B 49/08 251/176 |
| 7,341,434 B2 | * | 3/2008 | Belser .................... | F04B 49/08 417/212 |
| 7,555,899 B2 | * | 7/2009 | Maier ..................... | F04B 49/08 60/452 |

FOREIGN PATENT DOCUMENTS

DE 199 53 170 A1 5/2001

OTHER PUBLICATIONS

Bosch Rexroth AG, Axialkolben-Verstellpumpe A10VO, RD 92703/08.11, Aug. 2011, Horb a.N., Germany (56 pages) (German language document).
Bosch Rexroth AG, Axial Piston Variable Pump A10VO, RE 92703/08.11, Aug. 2011, Horb a.N., Germany (56 pages) (English language version of RD 92703/08.11).

* cited by examiner

*Primary Examiner* — Nathaniel Wiehe
*Assistant Examiner* — Michael Quandt
(74) *Attorney, Agent, or Firm* — Maginot, Moore & Beck LLP

(57) ABSTRACT

A hydraulic valve arrangement, in particular a control valve arrangement, of a hydraulic machine, in particular a hydraulic pump, includes at least one valve with a valve body penetrated by a pressure medium passage. The pressure medium passage has a minimum cross section that gives rise, in normal operation, to a control pressure downstream of the minimum cross section in accordance with a pressure acting at a pressure port of the valve. The minimum cross section is arranged close to a pressure medium passage mouth which is arranged upstream or is configured to be subjected to the high pressure. A hydraulic machine arrangement, in particular a pump arrangement, includes the hydraulic valve arrangement.

16 Claims, 3 Drawing Sheets

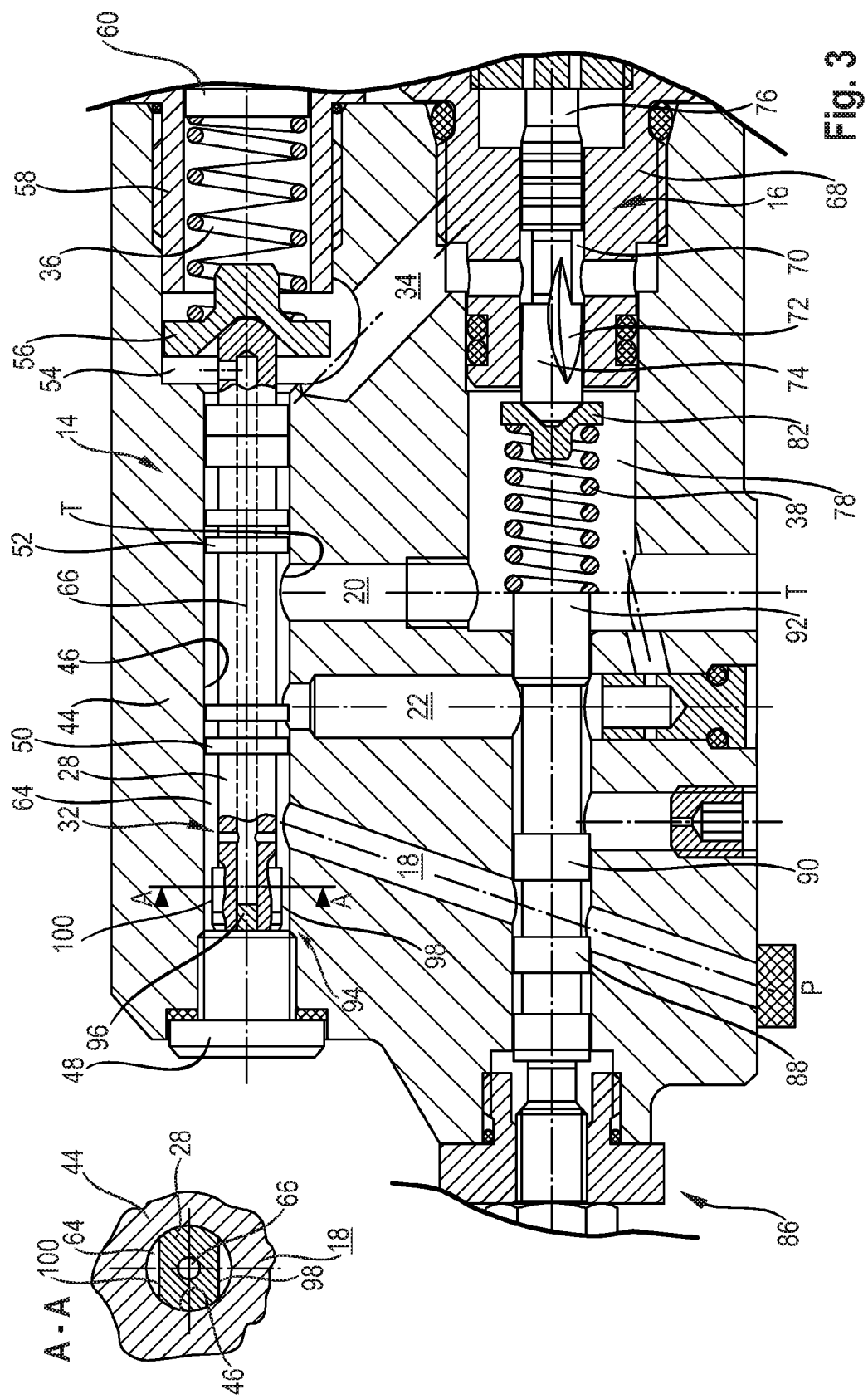

HYDRAULIC VALVE ARRANGEMENT AND HYDRAULIC MACHINE ARRANGEMENT HAVING A VALVE ARRANGEMENT OF THIS KIND

This application claims priority under 35 U.S.C. §119 to patent application no. DE 10 2012 218 903.3, filed on Oct. 17, 2012 in Germany, the disclosure of which is incorporated herein by reference in its entirety.

BACKGROUND

The disclosure relates to a hydraulic valve arrangement, in particular for pressure and/or volume flow control of a hydraulic machine, in particular a hydraulic pump, and to a hydraulic machine arrangement having a valve arrangement of this kind.

A hydraulic valve arrangement of this kind is known from Datasheet RD 92703/08.11 of the applicant and is used, in particular, in pressure and delivery flow control of hydraulic pumps, in particular axial piston pumps. The valve arrangement has a first valve, or a delivery flow control valve, by means of which the delivery volume flow of the hydraulic pump can be controlled. Control is effected by supplying a working space of an adjusting device of the hydraulic pump with an adjusting pressure controlled by the delivery flow control valve, leading to adjustment of a geometric swept or delivery volume of the hydraulic pump. For this purpose, a valve body of the delivery flow control valve is acted upon in the direction of a reduction of the geometric delivery volume, or in the direction of pressurization of the working space, by the pump pressure and in the direction of an increase in the geometric delivery volume, or of pressure relief of the working space, by a control pressure acting in the opposite direction and by a pressure equivalent of a control spring of the delivery flow control valve.

In this case, the control pressure used for this purpose is diverted from the high pressure or pump output pressure via a restriction device. For this purpose, the valve arrangement has a pressure medium passage which passes through the valve body of the delivery flow control valve and has a tapering segment, in particular a nozzle segment, with a minimum cross section. The pressure medium passage passes through the valve body from a pressure space that can be supplied with the high pressure toward a rear control space, in which the control pressure is effective. The control pressure is established downstream of the minimum cross section.

In this solution, limitation of the pump output pressure is accomplished by virtue of the fact that the control pressure produced in this way and acting on the valve plunger of the delivery flow control valve is limited by means of a second valve, or pressure limiting valve, of the valve arrangement. In this case, a valve plunger of the pressure limiting valve is acted upon in the direction of a connection of the control pressure to a pressure medium sink by the control pressure and by a pressure equivalent of an electromagnet and is acted upon in the closing direction of said connection by the pressure equivalent of an adjustable control spring. Accordingly, the set limit of the control pressure is smaller, the larger the actuating force of the electromagnet of the limiting valve. Since the pump pressure is controlled in such a way by means of the delivery flow control valve that it is higher by the pressure equivalent of the control spring than the control pressure, the pressure limiting valve and the set limiting value of the control pressure can be used to limit the high pressure or pump output pressure supplied by the hydraulic pump.

The disadvantage of this solution is that the pressure medium passage passing through the valve body of the delivery flow control valve is susceptible to soiling or blockage by dirt particles entrained in the pressure medium. The narrowing of the cross section resulting from such soiling leads to an increase in the pressure drop and hence to a distorted or lower control pressure. As a result, the pump output pressure formed is lower than that specified. Moreover, the soiling of the pressure medium passage can lead to instability in the control of the pump output pressure. In order to remove the soiling, normal operation has to be interrupted and the soiling has to be removed by expensive maintenance measures.

DE 199 53 170 A1 also shows a hydraulic valve arrangement of this kind having a delivery flow control valve and furthermore having a control valve which limits a delivery rate of the hydraulic pump in interaction with a power control valve coupled to an adjusting device of the hydraulic pump and designed as a pressure limiting valve. In this valve arrangement, the valve plunger of the control valve is penetrated from a pressure space subjected to the pump output pressure toward a rear space, in which the control pressure is effective, by a pressure medium passage having a constriction which is arranged at the end of the pressure medium passage and by means of which the pump pressure is throttled to the control pressure. In this solution too, the pressure medium passage is susceptible to soiling by metal fragments in the pressure medium or other dirt particles, as a result of which the control pressure can be distorted as in the solution described above. Since the valve plunger of the control valve is acted upon by the control pressure, the distortion thereof leads to distortion of the power control of the hydraulic pump.

Thus, both solutions have the disadvantage that the risk of control pressure distortion is high since the pressure medium passage can easily become clogged by dirt particles entrained in the pressure medium volume flow. In addition, there is the fact that removal of the soiling from the pressure medium passage involves a great deal of effort in terms of maintenance and entails interrupting normal operation of the valve arrangement.

Given this situation, it is the underlying object of the disclosure to provide a hydraulic valve arrangement which involves a reduced outlay in terms of maintenance. It is furthermore the underlying object of the disclosure to provide a hydraulic machine arrangement having a valve arrangement of this kind.

SUMMARY

The first object is achieved by a hydraulic valve arrangement having the features of the disclosure, and the second object is achieved by a hydraulic machine arrangement having the features of the disclosure.

Advantageous developments of the disclosure form the subject matter of the dependent claims.

A hydraulic valve arrangement has a first valve having a valve body, which is penetrated by a pressure medium passage having a minimum cross section. The minimum cross section is formed, in particular, at a nozzle or at a restrictor. In this case, a pressure acting at a pressure port of the first valve can be throttled to a control pressure by means of the minimum cross section. According to the disclosure, the minimum cross section is arranged close, in particular adjacent, to a pressure medium passage mouth that can be subjected to the pressure.

Compared with prior art solutions having a minimum cross section which, in relation to a control pressure medium volume flow which establishes itself in the pressure medium passage, is arranged close to a downstream mouth or in a central region of the pressure medium passage, the arrangement according to the disclosure of the minimum cross section has the advantage that the pressure medium passage can become clogged or blocked by dirt particles predominantly in a region of the mouth that can be subjected to the pressure and is thus close to an easily accessible surface of the valve body. Thus, according to the disclosure, these particles cannot penetrate far into the pressure medium passage. The dirt particles, which could result in distortion of the control pressure, can therefore be removed more easily than is known in the prior art, and the valve arrangement thus involves a reduced outlay in terms of maintenance. The dirt particles can be metal fragments or fouling particles, for example.

As a particularly preferred option, the valve arrangement is provided for the purpose of controlling at least one power parameter of a hydraulic machine, in particular of a hydraulic pump, wherein, in the case of the hydraulic pump, the power parameter that can be controlled by means of the first valve is preferably a delivery volume flow or a high pressure or pump output pressure. The hydraulic machine is preferably an axial piston pump or an axial piston motor of oblique-axis or swash plate construction and preferably has an adjustable geometric swept volume and, as an alternative thereto, a constant geometric swept volume.

The minimum cross section is preferably formed integrally with the valve body, in particular at a pressure medium passage segment designed as a nozzle or restrictor. As an alternative, it is preferably formed on a nozzle or restrictor body which is connected to the valve body, in particular inserted into the latter.

In a particularly preferred advantageous development of the valve arrangement, the mouth arranged upstream has the minimum cross section in order to enable a blockage of the minimum cross section to be removed in a particularly simple manner. The minimum cross section is thus arranged as close as possible to or at the mouth. A dirt particle of sufficient size which settles at the mouth thus projects outward beyond the mouth, at least in one segment, making it even easier to remove.

In order to further reduce the risk of blockage of the pressure medium passage, a filter is arranged in front of the pressure port of the first valve, said filter preferably being configured in such a way that it can be used to filter particles, the cross section of which is approximately equal to the minimum cross section of the pressure medium passage or is larger than said cross section. In order to further reduce the risk of blockage, an alternative or supplementary measure comprises configuring the filter in such a way that it can be used to filter particles, the cross section of which is smaller than the minimum cross section of the pressure medium passage.

An edge of the mouth preferably has a chamfer. This preferably has a shallow chamfer angle, or is inclined at a shallow angle to a circumferential surface of the valve body.

In a particularly advantageous development of the valve arrangement, the mouth is arranged on the valve body of the first valve in such a way that a pressure medium flow path, in particular that of a pressure medium volume flow flowing around or against the valve body of the first valve, at least over a certain segment, can form a tangent therewith. In this way, dirt particles clogging the mouth can be taken along and removed by flow forces of the pressure medium volume flow. In this way, self-cleaning of the mouth is made possible. If there is no pressure medium volume flow, self-cleaning takes place as soon as this is present again on the basis of a regulating or control movement of the valve body.

As a particularly preferred option, the valve arrangement is configured in such a way or is arranged in such a way in normal operation that the mouth that can be subjected to the pressure faces downward in relation to gravity.

The hydraulic pump is preferably adjustable, in particular configured with an adjustable geometric delivery volume, or it is preferably constant, in particular configured with a constant geometric delivery volume. In a particularly preferred development of the valve arrangement, the first valve is configured as a proportional directional control valve, in particular as a 3/2-way proportional control valve, which, in addition to the pressure port, has an adjusting pressure port and a low-pressure port, wherein the adjusting pressure port can be connected to the pressure port by means of a first valve position of the first valve and can be connected to the low-pressure port by means of a second valve position of the first valve. The adjusting pressure port can preferably be separated from the low-pressure port by means of the first valve position and from the pressure port by means of the second valve position. To enable the abovementioned self-cleaning of the mouth and to supply the adjusting pressure port with pressure medium, the above-described pressure medium flow path is preferably routed from the pressure port toward the adjusting pressure port of the first valve or can be formed by means of the first valve position thereof.

In a preferred development in the valve arrangement, the valve body of the first valve can be acted upon by the high pressure, in particular by a pressure dependent on the latter, in the opening direction of a connection of the pressure port to the adjusting pressure port and can be acted upon by the control pressure and a pressure equivalent of a control spring, in particular a spring with a constant or adjustable spring constant, in the closing direction of the connection. Consequently, the pressure medium volume flow or the pressure medium flow path thereof can form as soon as the high pressure is greater than a sum of the control pressure and the pressure equivalent.

If the hydraulic pump is of adjustable design, then, in a preferred development of the valve arrangement, the adjusting pressure port of the first valve can be connected to an adjusting device, in particular to an adjusting cylinder, of the adjustable hydraulic pump. In the case of the constant hydraulic pump, the delivery volume of which is not adjustable, the adjusting pressure port of the first valve can preferably be connected to a bypass valve or pressure limiting valve, by means of which a bypass volume flow or a tank volume flow, in particular, can be diverted from the delivery volume flow of the hydraulic pump.

In another preferred development of the valve arrangement, the valve body is guided axially in a valve bore and the mouth is arranged on a circumferential surface segment of the valve body which is set back radially from the valve bore.

In an advantageous development of the valve arrangement, the aim of making particularly efficient use of the high pressure for adjustment of the valve body is pursued by forming a flattened portion on an end segment of the valve body across the circumferential surface segment in which the mouth is arranged, said flattened portion being, in particular, planar or concave or convex. This enables an end face of the valve body to be acted upon by the high pressure.

In a preferred development, the first valve has a pressure space, through which the pressure medium volume flow can flow, at least over a certain segment, and which is bounded radially, at least over a certain segment, by the circumferential surface segment and the valve bore.

The pressure space is preferably bounded axially, at least over a certain segment, by an end face fixed in relation to the housing and by an end face arranged on a control collar of the valve body, which collar is, in particular, widened radially toward the circumferential surface segment. A control edge, by means of which the connection of the pressure port of the first valve to the adjusting pressure port thereof can be opened in the first valve position, is preferably arranged on the control collar.

In a preferred development of the valve arrangement, a mouth segment of the pressure medium passage preferably extends radially into the valve body from the mouth and, in particular, is designed as a radial passage or as a radial bore.

In order to prevent the entry of small or very small dirt particles into the pressure medium passage, a preferred development of the valve arrangement has a plurality or a multiplicity of, in particular two, such mouth segments, which open, in particular diametrically or in a star shape, into a following segment of the pressure medium passage, in particular a following segment which is widened and/or passes axially or diagonally or radially through the valve body, at least over a certain segment.

A particularly preferred and advantageous development of the valve arrangement has a second valve, in particular a pressure limiting valve, by means of which the control pressure can be limited. Since the high pressure is greater than the control pressure by the pressure equivalent of the control spring of the first valve, the high pressure or the pump output pressure can be limited in this way. Since a power of the hydraulic pump is the product of the pump output pressure and the delivery volume flow, a hydraulic power of the hydraulic pump can be limited in this way. The second valve preferably has a control pressure port, which can be supplied with the control pressure, and a low-pressure port, which can be connected to a pressure medium sink. A valve body of the second valve can preferably be acted upon in the opening direction of a connection of the control pressure port thereof to the low-pressure port thereof by the control pressure and by a pressure equivalent of an electromagnet, in particular an adjustable electromagnet, and can be acted upon in the closing direction of this connection by a pressure equivalent of a spring, in particular an adjustable spring. A characteristic of the second valve is preferably negative, wherein a maximum achievable control pressure or the upper limiting value thereof falls with an increasing actuating force, in particular with an increasing actuating current to the electromagnet. Consequently, the maximum achievable control pressure is smaller, the greater the current to the electromagnet of the second valve. As a particularly preferred option, a valve body of the second valve has a fine control geometry, in particular a fine control notch, in particular for fine control of an opening cross section of the connection of its control pressure port to its low-pressure port.

As a particularly preferred option, the valve arrangement according to the disclosure is provided for control of a hydrostatic drive of a fan.

A hydraulic machine arrangement, in particular a pump arrangement, according to the disclosure has the valve arrangement with the hydraulic pump in accordance with the above description, wherein the delivery volume flow of the hydraulic pump or the high pressure thereof can be controlled by means of the first valve. In a particularly preferred development of the machine arrangement, the high pressure can be limited by means of the second valve.

The machine arrangement is of particularly compact construction if it is arranged in just one housing or in a plurality of housings or housing parts connected securely, in particular detachably, to one another. As a particularly preferred option, the first valve or the first and the second valve is/are are accommodated in a valve housing or in a control block which is flanged to a housing of the hydraulic pump.

BRIEF DESCRIPTION OF THE DRAWINGS

A preferred illustrative embodiment of the disclosure is explained in greater detail below with reference to three drawings, in which:

FIG. 3 shows an enlarged detail of the view in FIG. 2.

DETAILED DESCRIPTION

Figure 1:
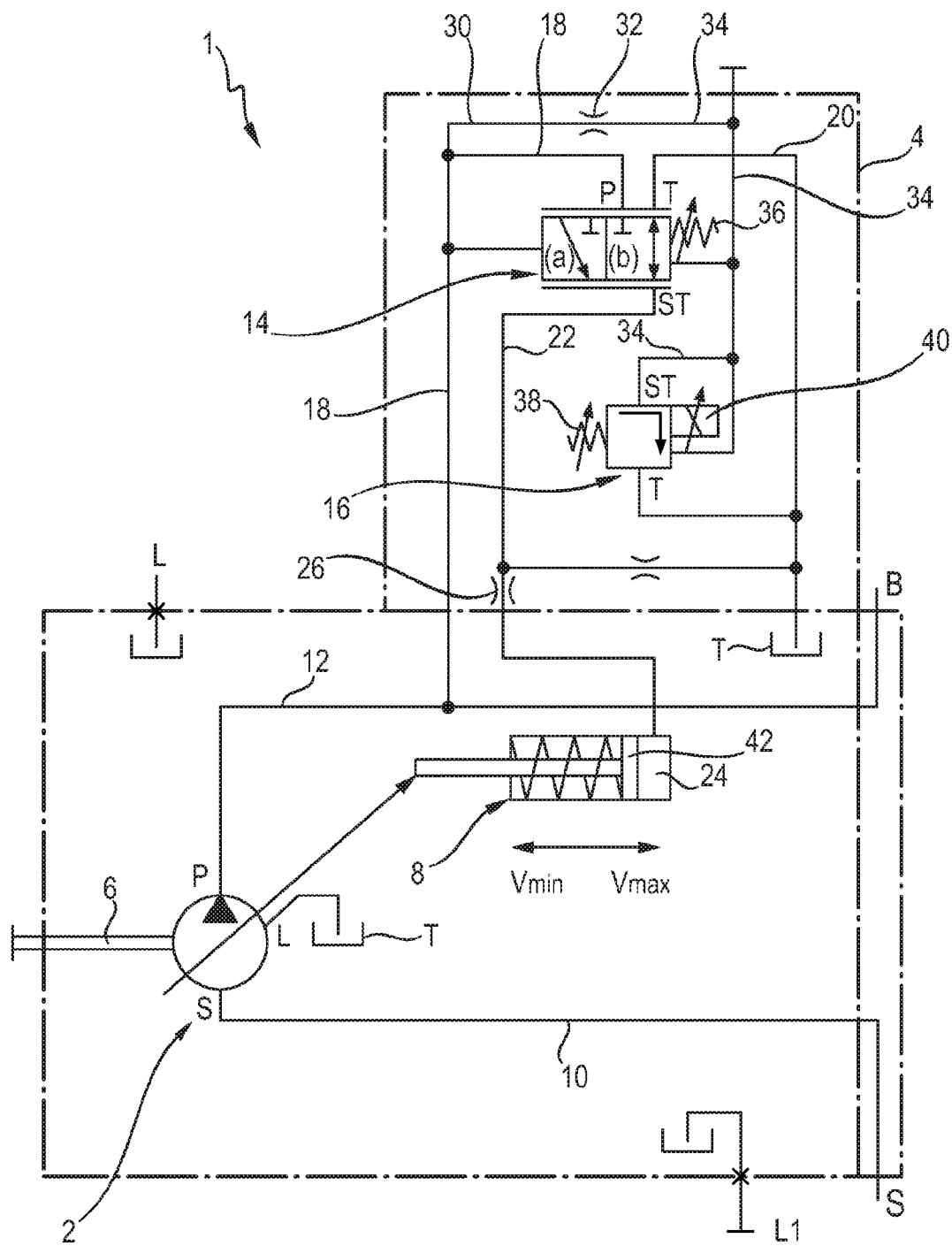
FIG. 1 shows a circuit diagram of a pump arrangement having a valve arrangement for controlling a delivery volume flow and for setting a maximum pump pressure.

According to FIG. 1, a hydraulic pump arrangement 1 has a hydraulic pump 2 and a hydraulic valve arrangement 4. The hydraulic pump 2 is configured as an adjustable axial piston machine of swash plate construction. It has a drive shaft 6, by means of which it can be coupled to a drive motor. It furthermore has a suction port S and a pressure port P. It is operated in a closed circuit and, for discharging a leakage flow, has a leakage port L, which is connected via a leakage line to a pressure medium sink, in particular a tank T. The hydraulic pump 2 furthermore has an adjusting device 8 configured as an adjusting cylinder. A piston rod of the adjusting device 8 is coupled to a pivot cradle (not shown) of the hydraulic pump 2. By means of the adjusting device 8, a pivoting angle of the hydraulic pump 2 and the geometric swept or delivery volume thereof can be adjusted.

A suction line 10 is connected to the suction port S, and a pressure line 12 is connected to the pressure port P. The pressure line 12 connects the pressure port P to a load port B of a hydraulic load (not shown). The valve arrangement 4 has a first valve 14 and a second valve 16. The first valve 14 is a delivery flow control valve embodied as a 3/2-way proportional control valve. The second valve 16 is configured as an electromagnetically adjustable pressure limiting valve. A pressure line 18 branches off from pressure line 12. Pressure line 18 is connected to a pressure port P of the delivery flow control valve 14. The delivery flow control valve 14 has a tank port T, which is connected by a low pressure line 20 to the tank T. The delivery flow control valve 14 furthermore has an adjusting pressure port ST, which is connected to a working space 24 of the adjusting cylinder 8 by an adjusting pressure line 22. A restrictor 26 for limiting an adjusting pressure medium volume flow is arranged in the adjusting pressure line 22.

The delivery flow control valve 14 has a first valve position (a) and a second valve position (b). In the first valve position (a), the pressure port P of the delivery flow control valve 14 is connected to the adjusting pressure port ST thereof. The tank port T is then shut off. In the second valve position (b), in contrast, the pressure port P is shut off and the adjusting pressure port ST is connected to the tank port T. In this case, the valve body 28 is acted upon in the direction of the first valve position (a) by the pressure in the pressure line 18. Branching off from pressure line 18, there is a pressure line 30, in which a nozzle 32 is arranged. The pressure acting in pressure line 30 is thus approximately the same as that in pressure line 18, whereas a reduced pressure or a control pressure is effective downstream of the nozzle 32. Accordingly, a pressure line downstream of the nozzle 32 is referred to as control pressure line 34. The control pressure derived from the pump pressure by means of this restriction acts together with a pressure equivalent of a control spring 36 and thus acts against the pump pressure in pressure line 18 in the direction of valve position (b) of the delivery flow control valve 14.

The control pressure line 34 is connected to a control pressure port ST of the pressure limiting valve 16. A tank port T of the pressure limiting valve 16 is connected to low pressure line 20 by a low pressure line and in this way is connected to the tank T. In the closing direction of a connection of the control pressure port ST to the tank port T, a valve body of the pressure limiting valve 16 is acted upon by the pressure equivalent of an adjustable spring 38. It can be acted upon in the opening direction by the control pressure effective in the control pressure line 34 and by a pressure equivalent of an adjustable electromagnet 40.

In normal operation, the hydraulic pump 2 delivers a pressure medium volume flow into pressure line 12 and thus to the hydraulic load (not shown) connected to the load port B. Apart from a flow-related pressure drop, a high or pump output pressure established in pressure line 12 is equally effective in pressure line 18. Pressure line 30, which branches off from pressure line 18, also has approximately this pressure, resulting in a slight control oil flow toward the control pressure line 34 via the nozzle 32. At the nozzle 32, there is a pressure drop, with the result that the control pressure in the control pressure line 34 is lower than that in pressure lines 30, 18 and 12. As a result, the valve body 28 of the delivery flow control valve 14 is, as described above, acted upon, on the one hand, approximately by the pump pressure prevailing in pressure line 18 and, on the other hand, by the control pressure effective in the control pressure line 34 and by the pressure equivalent of the control spring 36.

Let it be assumed that, at one point in time, the pressure in pressure line 18 is higher than the sum of the pressure equivalent and of the control pressure. In this case, the valve body 28 is moved in the direction of valve position (a), with the result that a pressure medium connection of the pressure port P of the delivery flow control valve 14 to the adjusting pressure port ST thereof is opened. As a result, pressure medium flows via the adjusting pressure line 22 and the restrictor 26 into the working space 24 of the adjusting cylinder 8 and can move the piston 42 thereof in the direction of a reduction in the delivery volume of the hydraulic pump 2. In this process, a pivoting angle of the axial piston machine is reduced. Given a constant speed of the hydraulic pump 2, its delivery volume flow subsequently decreases. This has the effect that a pressure in pressure line 12 and hence also in pressure line 18 falls, allowing a shift in the equilibrium of forces on the valve body 28 of the delivery flow control valve 14 such that the valve body 28 is moved in the direction of valve position (b). In a state of equilibrium, when the sum of the forces acting on the valve body is zero, the adjusting pressure port ST is separated both from the pressure port P and from the tank port T. At this moment, it is not possible for pressure medium to flow into or out of the working space 24. The delivery volume of the hydraulic pump 2 is then set to a constant level.

The pump pressure prevailing in pressure lines 12, 18, 30 is set by means of the pressure limiting valve 16. For this purpose, the electromagnet 40 is supplied with an actuating current, which corresponds to a setpoint of the pump pressure. Here, the pressure equivalent of the electromagnet assists the control pressure effective in the control pressure line 34 in opening the pressure medium connection of the control pressure port ST of the pressure limiting valve 16 to the tank port T thereof. For a given spring constant of the spring 38 of the pressure limiting valve 16, said spring acting in the closing direction, it follows that the control pressure is limited to a smaller value, the greater the current supplied to the electromagnet 40. A static current/pressure characteristic of the pressure limiting valve 16, which represents the achievable pump pressure against the current intensity of the electromagnet 40, is thus negative. For a current intensity of zero, the achievable pump pressure is at the maximum. Since the pump pressure in pressure lines 12, 18, 30 depends on the control pressure and the pressure equivalent of the control spring 36, it is thus possible to limit the pump pressure by limiting the control pressure.

Figure 2:
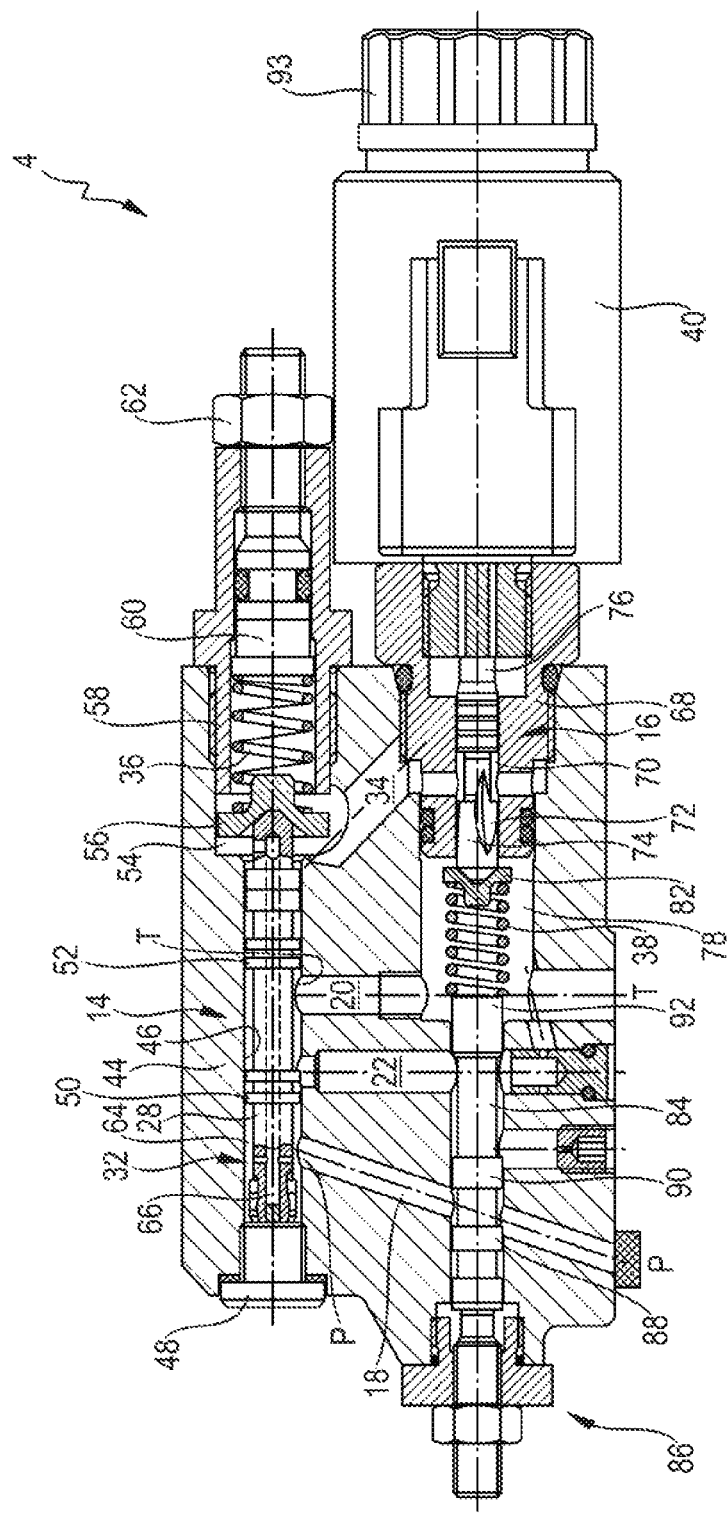
FIG. 2 shows the valve arrangement according to FIG. 1 in a longitudinal section.

FIG. 2 shows a longitudinal section through the valve arrangement 4 in the above description of the figure, which is used as a control valve arrangement for delivery flow control and pressure limitation of an adjustable axial piston pump in the illustrative embodiment shown. As explained at the outset, delivery flow control of the axial piston pump is accomplished by adjusting the geometric delivery volume, in particular the pivoting angle of the swash plate, by means of the adjusting cylinder, the working space of which, which performs the adjusting action, can be supplied by the valve arrangement 4 either with tank pressure or a system pressure, preferably the pressure at the outlet of the pump.

The valve arrangement 4 has a valve housing 44, in which the delivery flow control valve 14 and the pressure limiting valve 16 are accommodated coaxially with one another. The valve housing 44 has a valve bore 46, in which the valve body or valve plunger 28 of the delivery flow control valve 14 is accommodated in an axially guided manner. Also clearly visible is the pump port P, to which the pressure line or pressure passage 18 is connected. This passes diagonally through the valve housing 44 from the pump port P of the valve arrangement 4 to the pressure port P of the delivery flow control valve 14. The low pressure line or low-pressure passage 20 passes through the valve housing 44 from the tank or low-pressure port T of the valve arrangement 4 to the tank or low-pressure port T of the delivery flow control valve 14.

The valve bore 46 of the delivery flow control valve 14 is closed by a screw float 48 in an end segment which is supplied with the pump outlet pressure. A control collar 50, by means of which the pressure medium connection of the pressure medium passage 18 carrying the pump pressure to the adjusting pressure passage 22 can be shut off or opened, is formed on the valve plunger 28. In FIG. 2, the valve plunger 28 is shown in valve position (b) according to FIG. 1, in which the pressure medium passage 18 is shut off from the adjusting pressure passage 22. In this valve position (b), the adjusting pressure passage 22 is simultaneously connected to the low-pressure passage 20 via an annular space formed between the valve body 28 and the valve bore 46. By means of a further control collar 52, the low-pressure passage 20 is shut off from a rear space 54 of the delivery flow control valve 14, said rear space being at the control pressure.

A spring plate 56, on which the control spring 36 shown in FIG. 1 is supported by a first end segment, is seated on an end segment of the valve body 28 projecting into the rear space 54. The control spring 36 is guided axially in a screw-in sleeve 58 and is supported on an adjustable stop plunger 60 at its second end segment remote from the spring plate 56. The axial position of said plunger can be adjusted by means of an adjusting screw 62.

Starting from a pressure space 64 connected to pressure medium passage 18, the valve plunger 28 of the delivery flow control valve 14 is connected to the rear space 54 by a pressure medium passage 66 which passes through the valve plunger 28. A minimum cross section of pressure medium passage 66 is formed by means of the nozzle 32. This has two diametrically arranged mouth segments, which penetrate radially into the valve plunger 28 and open at the same point into a following segment of pressure medium passage 66, said segment extending approximately coaxially with the longitudinal axis of the valve body 28. Starting from the pressure space 64, there is a pressure drop across the nozzle 32, resulting in the control pressure in accordance with the above description downstream of the nozzle 32. For a detailed description of pressure medium passage 66 and of the nozzle 32, reference may be made to the description of FIG. 3.

The rear space 54 of the delivery flow control valve 14, in which the control pressure is effective, is connected by the control pressure passage 34 to a pressure space 70 formed in a valve bushing 68 of the pressure limiting valve 16. The pressure space 70, or the control pressure passage 34, can be shut off from a spring space 78, in which the control spring 38 is arranged, by means of a control collar 74 of a valve body 76 of the pressure limiting valve 16, said collar being provided with a fine control notch 72. In this way, it can also be separated from the low-pressure passage 20 or from the tank port T of the valve arrangement 4. FIG. 2 shows a position of the valve body 76 in which the control pressure passage 34 is shut off from the spring space 78.

The spring 38 is supported on the valve body 76 of the pressure limiting valve 16 via a spring plate 82. At its opposite end segment, it is supported on a stop pin 84. The stop pin 84 is arranged coaxially with the valve body 76 and passes through the valve housing 44. In doing so, it also intersects pressure medium passage 18 and the adjusting pressure passage 22. At an outlet opening of the housing, the stop pin 84 emerges from the housing and can be adjusted and locked in its axial position by means of an adjusting screw arrangement 86. Arranged on the stop pin 84 is a sealing collar 88, by means of which a pressure medium connection of pressure medium passage 18 to the outlet opening and to atmosphere is prevented. By means of a sealing collar 90 on the stop pin 84, a pressure medium connection of pressure medium passage 18 to the adjusting pressure passage 22 is prevented and, by means of a sealing collar 92, a pressure medium connection of the adjusting pressure passage 22 to the low-pressure passage 20 is prevented.

According to the above description, the valve body 76 of the pressure limiting valve 16 can be acted upon by the control pressure and by the pressure equivalent of the electromagnet 40 in order to open the pressure medium connection of the control pressure passage 34 to the low-pressure passage 20. Here, the actuating current to the electromagnet 40 can be adjusted by means of an adjusting element 93. The pressure equivalent of the spring 38 counteracts the control pressure and said pressure equivalent of the electromagnet 40.

For a more detailed illustration of the pressure medium channel 66 passing through the valve plunger 28, FIG. 3 shows an enlarged detail of FIG. 2. At the top left in FIG. 3, there is furthermore a sectional view A-A for this purpose, showing a cross section of the valve plunger 28 in the region of the nozzle 32 arranged according to the disclosure. It can be clearly seen that pressure medium passage 66 is designed as an approximately coaxial blind bore in the valve plunger 28. A bore inlet is arranged in that end segment 94 of the valve plunger 28 which can be acted upon by the pressure in pressure medium passage 18. In order, in particular, to be able to act upon the entire end face of the valve plunger 28 with this pressure and in order to prevent a bypass volume flow bypassing the nozzles 32, the bore inlet is closed by means of a plug 96.

Since the pressure space 64 is shut off substantially without leaks from the adjusting pressure passage 22 by means of the control collar 50, the two nozzles 32 represent the only pressure medium outlets of the pressure space 64 in the position of the valve plunger 28 shown in FIG. 3. Consequently, a small control pressure medium volume flow toward the rear space 54 can be established via the nozzles 32, giving rise to the above-described pressure drop and control pressure. According to the disclosure, the nozzles 32 are arranged at the start of this pressure medium flow path. If dirt particles reach the delivery flow control valve 14 via pressure medium passage 18, such particles, the cross section of which corresponds approximately to the minimum cross section of the nozzles 32 or is larger than the latter, cannot penetrate into pressure medium passage 66. If one or more of the nozzles 32 were arranged in pressure medium passage 66 in the conventional manner, dirt particles could penetrate into it and would cause a blockage within pressure medium passage 66, which it would be possible to remove subsequently only by expensive maintenance measures.

Let it now be assumed that a dirt particle is blocking a mouth of one of the nozzles 32 facing the pressure space 64. In the course of the control function of the delivery flow control valve 14 and of an associated axial control movement of the valve plunger 28, the latter moves in the direction of opening of the pressure medium connection of pressure medium passage 18 to the adjusting pressure passage 22, i.e. to the right in FIG. 3. As already explained, this is the case when the force resulting from the pump pressure acting in the pressure space is greater than the spring force of the control spring 36 and the force resulting from the control pressure acting in the rear space 54. If, during this process, a pressure medium connection arises between pressure medium passage 18 and the adjusting pressure passage 22, there is a pressure medium volume flow, the pressure medium flow paths of which forms a tangent to the mouths of the nozzles 32 which face the pressure space 64. In this way, the dirt particle can be taken along by the pressure medium volume flow and the mouth of the nozzle 32 cleaned. The arrangement according to the disclosure of the nozzle 32 thus leads not only to prevention of the penetration of dirt particles into pressure medium passage 66 but also to a self-cleaning effect during the control position, just explained, of the valve plunger 28.

As can be seen from the section A-A shown at the top left in FIG. 3, the valve plunger 28 has two diametrically arranged flattened portions 98 and 100. These are necessary in order to guide the pressure of pressure medium passage 18 to the end face of the valve plunger 28 arranged adjacent to the screw plug 48. At this point, the necessity of the screw plug 96 is obvious since, if it were absent, there would be a bypass flow that cut out the nozzles 32. Here, an effective area of the valve plunger 28 which can be acted upon by the pressure in the pressure space 64 corresponds to the cross-sectional area of the valve bore 46. In this case, the cross-sectional area is composed of two circular segment areas formed on the control collar 50 and of the end face of the end segment 94 of the valve plunger 28.

A disclosure is made of a hydraulic valve arrangement, in particular a control valve arrangement of a hydraulic machine, in particular a hydraulic pump, having at least one valve. The valve body thereof is penetrated by a pressure medium passage which has a minimum cross section, thereby giving rise, in normal operation, to a control pressure downstream of the minimum cross section in accordance with a pressure acting at a pressure port of the valve. In this case, the minimum cross section is arranged close to a pressure medium passage mouth which is arranged upstream or can be subjected to the high pressure. A disclosure is furthermore made of a hydraulic machine arrangement, in particular a pump arrangement, having a valve arrangement of this kind.

What is claimed is:

1. A hydraulic valve arrangement, comprising:
   a first valve including:
      a pressure port having a high pressure; and
      a valve body movable in a valve bore and defining a pressure medium passage having a first channel portion extending axially along the valve body and a second channel portion extending radially from the first channel portion to an outer surface of the valve body, the second channel portion including a first end at the outer surface, the second channel portion having a minimum cross sectional area, which is less than an entire cross sectional area of the first channel portion, at the first end, the minimum cross sectional area being configured to throttle the high pressure to a control pressure present in the first channel portion,
   wherein the high pressure acts upon a first end face of the valve body in a first direction, and a spring and the control pressure act upon the valve body in a second opposite direction, and
   wherein the first channel portion has a first end that is closed off from the first end face of the valve body and the high pressure is connected to the first end face of the valve body outside the valve body.

2. The valve arrangement according to claim 1, wherein a pressure medium flow path of a pressure medium volume flow flowing around or against the valve body forms a tangent to the second channel portion at the first end.

3. The valve arrangement according to claim 1, wherein the first valve is configured to control a delivery volume flow or the high pressure produced by a hydraulic pump.

4. The valve arrangement according to claim 1, wherein the first valve is configured as a proportional directional control valve having an adjusting pressure port and a low-pressure port, and wherein the adjusting pressure port is configured to be (i) connected to the pressure port by a first valve position of the first valve and (ii) connected to the low-pressure port by a second valve position of the first valve.

5. The valve arrangement according to claim 4, wherein the valve body is configured to be (i) acted upon by the high pressure in the opening direction of a connection of the pressure port and the adjusting pressure port and (ii) acted upon by the control pressure and a pressure equivalent of a control spring in the closing direction of the connection.

6. The valve arrangement according to claim 4, wherein the first valve is configured to control a delivery volume flow of an adjustable hydraulic pump via a connection between the adjusting pressure port and an adjusting device of the adjustable hydraulic pump.

7. The valve arrangement according claim 1, wherein the valve body is guided axially in a valve bore and the first end of the second channel portion is arranged on of the valve body at a position which is radially spaced apart from the valve bore.

8. The valve arrangement according to claim 7, wherein an end segment of the valve body includes a flattened portion having a planar surface extending along an axial direction of the valve body so as to define a pressure space between the valve body and the valve bore that fluidly connects a volume adjacent the first end face of the valve body to the pressure port such that the high pressure acts on the first end face.

9. The valve arrangement according to claim 8, wherein the pressure space is bounded axially by a second end face fixed in relation to a housing of the first valve and by a third end face of a control collar arranged on the valve body.

10. The valve arrangement according to claim 8, wherein the first valve further comprises a plug in the valve body sealing the first end of the first channel portion from the first end face of the valve body.

11. The valve arrangement according to claim 1, wherein the pressure medium passage includes a third channel portion extending radially from the first channel portion to the outer surface of the valve body, the third channel portion having a second end at the outer surface, the second end having the minimum cross sectional area, and the second channel portion and the third channel portion are both arranged at an end segment of the valve body.

12. The valve arrangement according claim 1, further comprising a second valve configured to limit the control pressure.

13. The valve arrangement according to claim 1, wherein the second channel portion is formed as a radial bore extending from the first end to the to the first channel portion, the radial bore having the minimum cross-sectional area along an entire length of the second channel portion.

14. A hydraulic machine arrangement, comprising:
   a hydraulic pump configured to produce a high pressure;
   a hydraulic valve arrangement including:
      a first valve configured to control a delivery volume flow or the high pressure of the hydraulic pump, the first valve including:
         a pressure port having a high pressure; and
         a valve body movable in a valve bore and defining a pressure medium passage having a first channel portion extending axially along the valve body and a second channel portion extending radially from the first channel portion to an outer surface of the valve body, the second channel portion including a first end at the outer surface, and the second channel portion having a minimum cross sectional area, which is less than an entire cross sectional area of the first channel portion, at the first end, the minimum cross sectional area being configured to throttle the high pressure to a control pressure present in the first channel portion,
      a second valve configured to limit the control pressure,
   wherein the high pressure acts upon a first end face of the valve body in a first direction and a spring and the control pressure act upon the valve body in a second opposite direction, and
   wherein the first channel portion has a first end that is closed off from the first end face of the valve body and the high pressure is connected to the first end face of the valve body outside the valve body.

15. The hydraulic machine arrangement according to claim 14, wherein the machine arrangement is accommodated in one housing or in a plurality of housings or housing parts connected securely to one another.

16. The hydraulic machine arrangement according to claim 14, wherein the hydraulic machine arrangement is configured as a pump arrangement.

* * * * *